United States Patent
Hsu et al.

(10) Patent No.: US 8,731,769 B2
(45) Date of Patent: May 20, 2014

(54) INERTIAL SENSOR CALIBRATION METHOD FOR VEHICLES AND DEVICE THEREFOR

(75) Inventors: Chan-Wei Hsu, Changhua Hsien (TW); Liang-Yu Ke, Kaohsiung (TW)

(73) Assignee: Automotive Research & Testing Center, Changhua Hsien (TW)

( * ) Notice: Subject to any disclaimer, the term of this patent is extended or adjusted under 35 U.S.C. 154(b) by 246 days.

(21) Appl. No.: 13/246,136

(22) Filed: Sep. 27, 2011

(65) Prior Publication Data

US 2013/0079948 A1    Mar. 28, 2013

(51) Int. Cl.
*G01M 17/00* (2006.01)
(52) U.S. Cl.
USPC ........................................... 701/33.1
(58) Field of Classification Search
CPC .......... G01M 17/00; G06F 7/00; G06F 10/00; G06F 11/30; G01C 21/00; G01C 21/10
USPC ............... 701/33.1, 33.7, 34.1, 500, 502, 505
See application file for complete search history.

(56) References Cited

U.S. PATENT DOCUMENTS

| | | | |
|---|---|---|---|
| 2010/0057297 A1* | 3/2010 | Itagaki et al. | 701/38 |
| 2012/0203488 A1* | 8/2012 | Dusha | 702/104 |

* cited by examiner

*Primary Examiner* — Kim T Nguyen
(74) *Attorney, Agent, or Firm* — Bacon & Thomas, PLLC

(57) ABSTRACT

An inertial sensor calibration method has steps of mounting an observer device and an inertial sensor of a vehicle carrying on an inertial move, acquiring actual vehicle motion data from the observer device and inertial signal data of the inertial sensor, calculating an integral corresponding to the vehicular dynamic variation model with respect to the inertial signal data to obtain predicted vehicle sensor data and calculating variations of the actual vehicle motion data, acquiring differences between the two calculated data, applying an energy optimization and a discretization to the differences so as to obtain parametric error variances, and feeding back the parametric error variances to the vehicular dynamic variation model to calibrate the parameters associated with offset and scale factor and acquire a calibrated vehicular dynamic variation model. Under the premise of no GPS, electronic compass or pressure sensor, the present invention can secure positioning continuity and reliability.

11 Claims, 4 Drawing Sheets

INERTIAL SENSOR CALIBRATION METHOD FOR VEHICLES AND DEVICE THEREFOR

BACKGROUND OF THE INVENTION

1. Field of the Invention

The present invention relates to an inertial sensor for vehicles, and more particularly to an inertial sensor calibration method for vehicles and a device therefor.

2. Description of the Related Art

Considering more comfortable and safer driving, many car manufacturers have started building affordable luxury cars equipped with built-in or attached multi-functional electronic devices, such as adaptive headlights, navigation systems, instant traffic alerts and the like, to implement and assist automatic driving.

Most vehicle electronic devices mainly target at assisting drivers to pay attention to or adjust safe driving functions based on instant traffic condition. Given the adaptive headlight as an example, the high beam, low beam and beam shapes thereof can be switched or adjusted in accordance with a driving or road condition when the vehicle makes a turn, goes uphill or goes downhill. Furthermore, a navigation system indicates current vehicle location and provides driving directions to drivers. Hence, those built-in or attached electronic devices need to obtain the instant dynamic information of vehicles so as to perform the optimized control.

At present the devices normally used to provide dynamic inertial information for vehicles are called inertial sensors, such as accelerometers, gyroscopes and the like. For example, the accelerometers and the gyroscopes serve to detect speed, acceleration and angular velocity of vehicles for truly reflecting conditions of vehicles on the move. The signals sensed from inertial sensors must go through effective computation (i.e. integral computation) to result in useful and correct vehicle moving information. To minimize the error of the computation result, a calibration is usually carried out in collaboration with a GPS navigation system, an electronic compass or a pressure sensor. However, those electronic devices used for calibrating errors generated in computation of inertial sensors are sensitive geographically. For example, satellite signals are lost when the electronic devices pass by high-rise buildings or enter an underground passage, the earth magnetic field strength is relatively weak and the pressure is affected when measured in a tunnel. Hence, the signals originally serving as reference values for calibration either disappear or become worse in terms of correctness so that the error resulting from the integral computation for the sensed signals of the inertial sensors cannot be lowered. Accordingly, the electronic device using sensed signals of inertial sensors as control signals fail to provide most adaptive driver assistance when passing through those geographical zones where signals are gone or attenuated. As far as a navigation system is concerned, the positioning continuity and reliability of the navigation system is both degraded and fails to deliver positioning accuracy when the navigation system passes through an underground passage and fails to smoothly receive satellite signals, and the navigation system may temporarily lose its tracking ability. As far as an adaptive headlight is concerned, the optimized beam projecting angle or beam shape of the headlight may not be available when the headlight goes through the signal-attenuated zones.

SUMMARY OF THE INVENTION

An objective of the present invention is to provide an inertial sensor calibration method for vehicles and a device therefor capable of solving the drawback of lacking positioning continuity and reliability.

To achieve the foregoing objective, the inertial sensor calibration method for vehicles has steps of:

mounting an observer device and an inertial sensor of a vehicle carrying on an inertial move;

acquiring actual vehicle motion data from the observer device and inertial signal data from the inertial sensor within a cycle;

creating an original vehicular dynamic variation model to integrate the inertial signal data within the cycle to obtain predicted vehicle motion data, wherein the vehicular dynamic variation model has multiple parameters associated with offset and scale factor;

acquiring differences between variations of the actual vehicle motion data over the cycle and the predicted vehicle motion data;

applying an energy optimization and a discretization to the differences so as to obtain multiple parametric error variances; and calibrating the original vehicular dynamic variation model according to the parametric error variances to acquire a calibrated vehicular dynamic variation model.

To achieve the foregoing objective, the inertial sensor calibration device for vehicles has an observer device, an inertial sensor, a memory unit and a CPU.

The observer device senses and outputs actual vehicle motion data of a vehicle carrying on an inertial move.

The inertial sensor senses inertial signal data of the vehicle and outputs the sensed inertial signal data.

The memory unit is electrically connected to the observer device and the inertial sensor to store the actual vehicle motion data, the sensed inertial signal data and a vehicular dynamic variation model having multiple parameters associated with offset and scale factor.

The processor is electrically connected to the memory unit and is built in with a learning and calibration procedure for learning actual vehicle motion data associated with various road conditions, calibrating the vehicular dynamic variation model and storing the calibrated vehicular dynamic variation model back to the memory unit.

The present invention allows the inertial sensor to learn various road conditions in advance so that constant positioning continuity and reliability can be addressed by calculating vehicle moving data variation based on the current road condition even at absence of any GPS or under four satellites signals, electronic compass or pressure sensor. Accordingly, real-time vehicle moving data can be provided to enhance positioning continuity and reliability with auxiliary calibrated inertial sensors.

Other objectives, advantages and novel features of the invention will become more apparent from the following detailed description when taken in conjunction with the accompanying drawings.

DETAILED DESCRIPTION OF THE INVENTION

Figure 1:
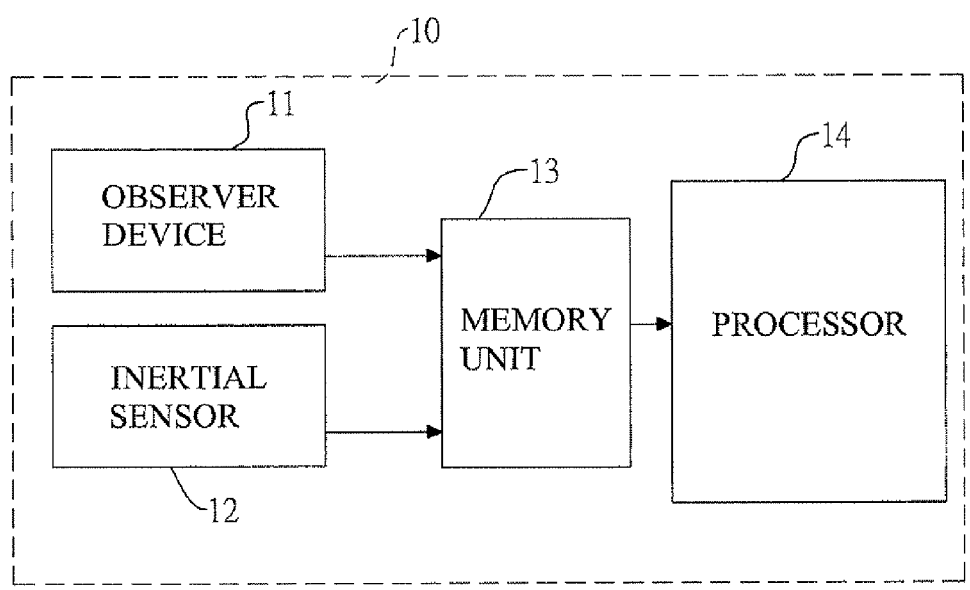
FIG. 1 is a functional block diagram of an inertial sensor calibration device for vehicles in accordance with the present invention.

With reference to FIG. 1, an inertial sensor calibration device 10 for vehicles has an observer device 11, an inertial sensor 12, a memory unit 13 and a processor 14.

The observer device 11 senses and outputs actual vehicle motion data of a vehicle carrying on an inertial move.

The inertial sensor 12 senses inertial signal data of the vehicle and outputs the sensed inertial signal data.

The memory unit 13 is electrically connected to the observer device 11 and the inertial sensor 12 to store the actual vehicle motion data, the sensed inertial signal data and a vehicular dynamic variation model having multiple parameters associated with offset, scale factor and the like.

The processor 14 is electrically connected to the memory unit 13 and is built in with a learning and calibration procedure for learning actual vehicle motion data associated with various road conditions, calibrating the vehicular dynamic variation model and storing the calibrated vehicular dynamic variation model back to the memory unit 13.

Figure 2:
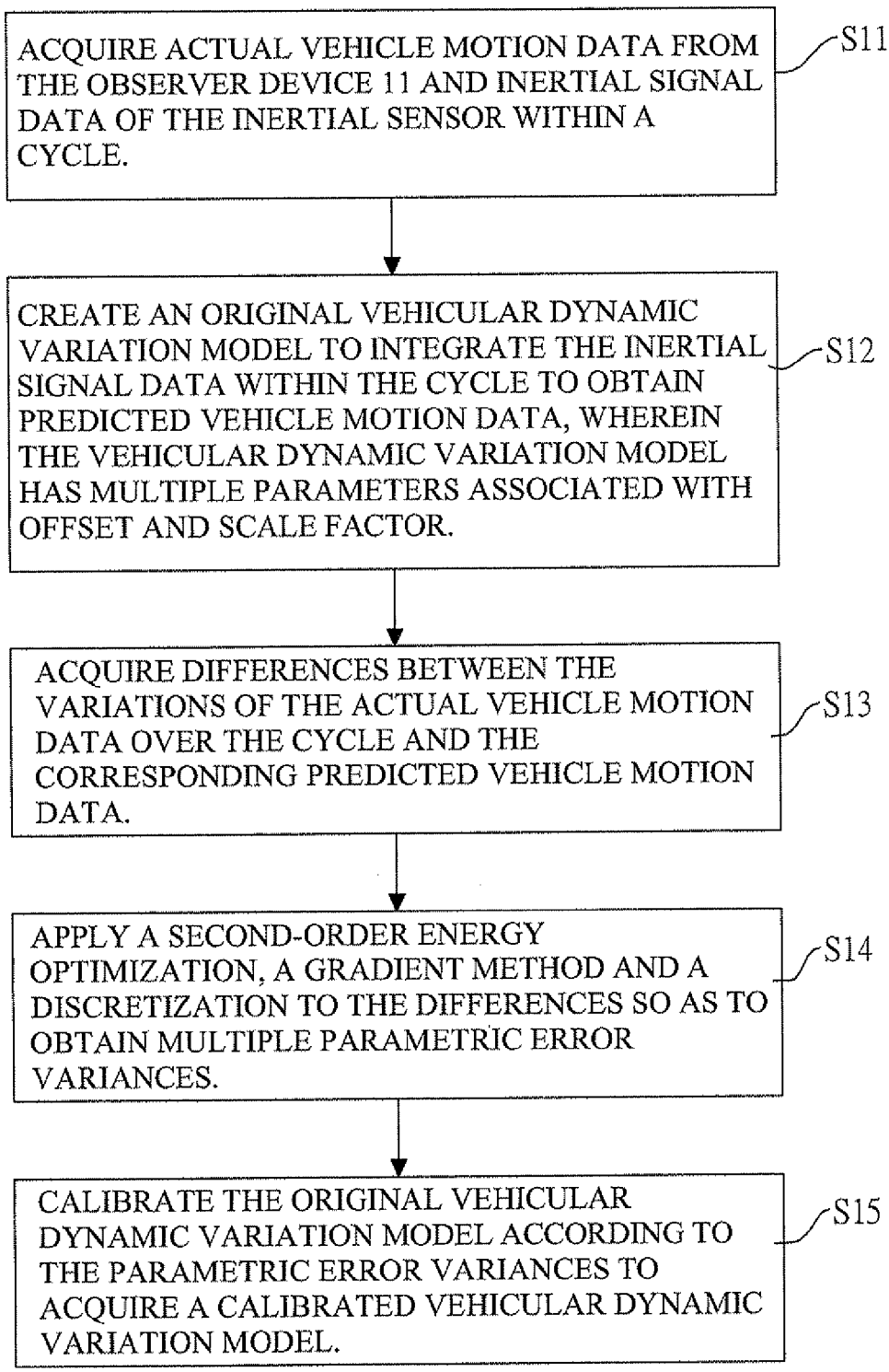
FIG. 2 is a flow diagram of an inertial sensor calibration method in accordance with the present invention.

With reference to FIG. 2, the foregoing learning and calibration procedure has the following steps.

Figure 3A:
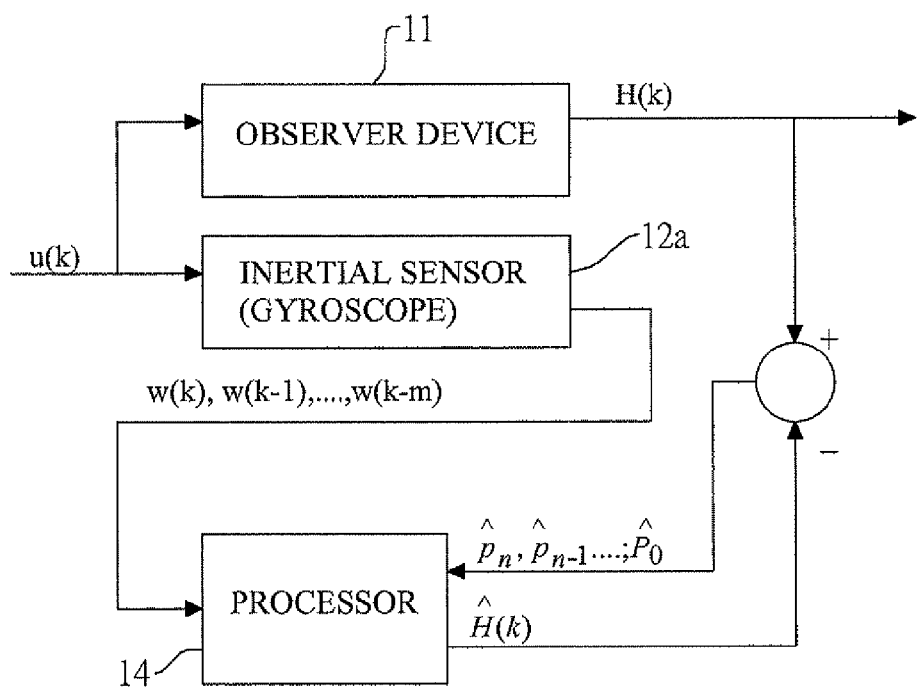
FIG. 3A is a functional block diagram of the inertial sensor calibration device for vehicles in FIG. 1 using a gyroscope.
Figure 3B:
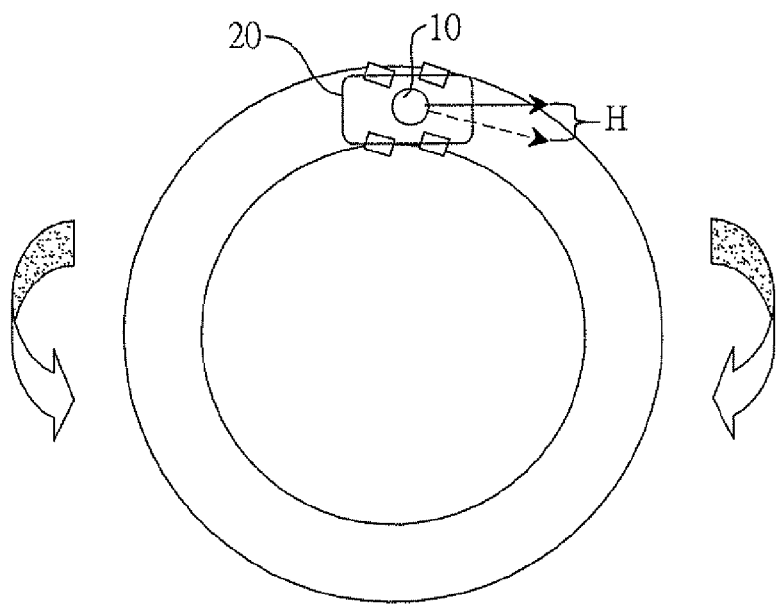
FIG. 3B is a schematic view of the inertial sensor calibration device for vehicles in FIG. 1 for fine-tuning and calibrating a gyroscope.

Mount an observer device 11 and an inertial sensor 12a of a vehicle 20 carrying on an inertial move as shown in FIGS. 3A and 3B.

Acquire actual vehicle motion data from the observer device 11 and inertial signal data of the inertial sensor (S11) within a cycle.

Create an original vehicular dynamic variation model to integrate the inertial signal data within the cycle to obtain predicted vehicle motion data wherein the vehicular dynamic variation model has multiple parameters associated with offset and scale factor (S12).

Acquire differences between the variations of the actual vehicle motion data over the cycle and the corresponding predicted vehicle motion data (S13).

Apply a second-order energy optimization, a gradient method and a discretization to the differences so as to obtain multiple parametric error variances (S14).

Calibrate the original vehicular dynamic variation model according to the parametric error variances to acquire a calibrated vehicular dynamic variation model (S15).

The process of learning the calibrating vehicular dynamic variation model can be illustrated with the example using a gyroscope 12a.

With reference to FIG. 3A, the gyroscope 12a is used to sense angular speeds of the vehicle 20. Firstly, initial parameters of the gyroscope 12a are set up. The vehicle 20 then starts carrying on an inertial motion u(k) by circling. Meanwhile, the observer device 11 outputs actual heading angles H(k) and the gyroscope 12a outputs angular speeds w(k) within a cycle. The memory unit 13 periodically stores the angular speeds w(k) in an array. The processor 14 retrieves the angular speeds w(k) in the array from the memory unit 13 and substitutes the angular speeds w(k) into the vehicular dynamic variation model for integral calculation within the cycle so as to obtain predicted angle variation Ĥ(k) in the cycle, as shown in Eqn. (1).

$$\hat{H}(k) = \int (\hat{p}_n w^n + \hat{p}_{n-1} w^{n-1} + \ldots + \hat{p}_0) dt; e_{\hat{H}}(K) = \hat{H}(k) \quad (1)$$

When calculating the integral, the processor 14 simultaneously reads the actual heading angles H(k) from the memory unit 13, calculates variations of the actual rotation angles $e_H[k]$ in the cycle as shown in Eqn. (2a), and obtains differences between the variations of the actual rotation angles in the cycle $e_H(k)$ and the corresponding predicted angle variation Ĥ[k] or $e_{\hat{H}}(k)$ A second order energy optimization is applied in Eqn. (2b) to the difference to obtain $J_W$. A gradient method is subsequently applied in Eqn. (3). A discretization is applied in Eqn. (4) to calculate the parametric error variances associated with scale factor $\hat{p}_n, \hat{p}_{n-1}, \ldots, \hat{p}_1$ (scale factor variance) and with offset error $\hat{p}_0$ (offset error variance) in the vehicular dynamic variation model.

$$e_H[k] = H[k] - H[k-m] \quad (2a)$$

$$J_W = \frac{1}{2}(e_H(k) - e_{\hat{H}}[k])^2 \quad (2b)$$

$$\hat{p} = -\lambda_{gyro}\frac{\partial J_w}{\partial P} \quad (3)$$

$$\begin{bmatrix} \hat{p}_n[k] \\ \hat{p}_{n-1}[k] \\ \vdots \\ \hat{p}_0[k] \end{bmatrix} = \begin{bmatrix} \hat{p}_n[k-1] \\ \hat{p}_{n-1}[k]-1 \\ \vdots \\ \hat{p}_0[k] \end{bmatrix} + \lambda_{gyro} \cdot (e_H[k] - e_{\hat{H}}[k]) \cdot \begin{bmatrix} w^n \\ w^{n-1} \\ \vdots \\ 1 \end{bmatrix} \quad (4)$$

where $\lambda_{gyro}$ represents a learning rate of the gyroscope.

Since the output of the inertial sensor is in the form of analog voltage and the computation result of the prior period integral is in the form of digital data, an additional analog to digital conversion needs to be performed. In an analog to digital conversion process a sensitivity of the inertial sensor is reduced for sake of quantization error and threshold judgment in sampling. A fine-tuning and calibrating process may as well be performed to obtain a predicted rotation approximating to an actual rotation angle.

With reference to FIG. 3B, as indicated in the fine-tuning and calibrating process, a vehicle 20 equipped with the observer device 11 repeatedly moves along a fixed turning angle, for example, turning the steering wheel all the way to the right and the left and circle n times respectively. Thus, actual rotation angles H can be substantially acquired and are compared with the predicted rotation angles obtained from the calibrated vehicular dynamic variation model so as to adjust the offset and scale factor of the calibrated vehicular dynamic variation model until the differences between the actual rotation angles and the corresponding predicted rotation angles are close to zero.

The process of learning the calibrating vehicular dynamic variation model can be further illustrated with the example using an accelerometer 12b.

Figure 4A:
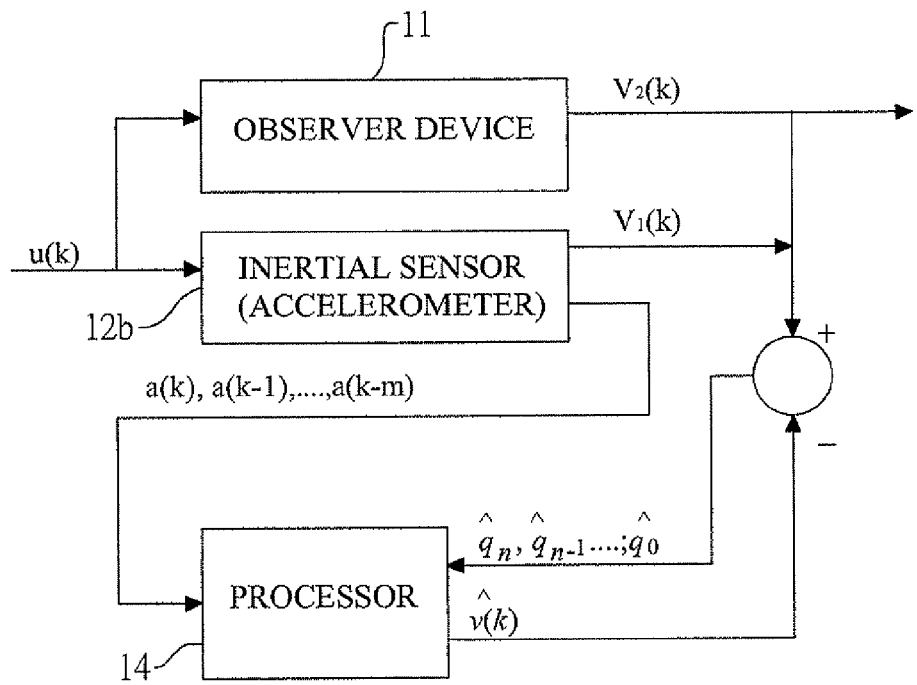
FIG. 4A is a functional block diagram of the inertial sensor calibration device for vehicles in FIG. 1 using an accelerometer.

With reference to FIG. 4A, the accelerometer 12b is used to sense acceleration of the vehicle 20. Firstly, initial parameters of the accelerometer 12b are set up. The vehicle 20 then starts carrying on an inertial motion u(k) by linear acceleration. Meanwhile, the observer device 11 outputs actual vehicle speeds $v_2(k)$ and the accelerometer 12b outputs actual acceleration variations $v_1(k)$ and accelerations a(k) within a cycle. The memory unit 13 periodically stores the accelerations a(k) in an array. The processor 14 retrieves the accelerations a(k)

in the array from the memory unit 13 and substitutes the accelerations a(k) into the vehicular dynamic variation model for integral calculation within the cycle so as to obtain predicted speed variation $\hat{v}[k]$ in the cycle, as shown in Eqn. (5).

$$\hat{v}[k] = \int (\hat{q}_n a^n + \hat{q}_{n-1} a^{n-1} + \ldots + \hat{q}_0) dt; \, e_{\hat{v}}[t] = \hat{v}[k] \quad (5)$$

When calculating the integral, the processor 14 simultaneously reads the actual acceleration variations $v_1(k)$ and vehicle speeds $v_2(k)$ from the memory unit 13, calculates variations of the actual vehicle speeds $e_{v1}(t)$ and $e_{v2}(t)$ in the cycle as shown in Eqn. (6a, 6b), and obtains differences between the variations of the actual acceleration variation in the cycle $e_{v1}(t)$ or actual vehicle speeds $e_{v2}(t)$ and the corresponding predicted speeds variation $\hat{v}[k]$ or $e_{\hat{v}}(k)$. A second order energy optimization is applied in Eqn. (6c) to the difference to obtain J. A gradient method is subsequently applied in Eqn. (7). A discretization is applied in Eqn. (8) to calculate the parametric error variances associated with offset (offset error variance) and scale factor (scale factor error variance) in the vehicular dynamic variation model.

$$e_{v1}[t] = v_1[k] - v_1[k-m] \quad (6a)$$

$$e_{v2}[t] = v_2[k] - v_2[k-m] \quad (6b)$$

$$J_v = \frac{1}{2}(e_v(k) - e_{\hat{v}}[k])^2 \quad (6c)$$

$$\hat{q} = -\lambda_{acc} \frac{\partial J_v}{\partial \hat{q}} \quad (7)$$

$$\begin{bmatrix} \hat{q}_n[k] \\ \hat{q}_{n-1}[k] \\ \vdots \\ \hat{q}_0[k] \end{bmatrix} = \begin{bmatrix} \hat{q}_n[k-1] \\ \hat{q}_{n-1}[k] - 1 \\ \vdots \\ \hat{q}_0[k] \end{bmatrix} + \lambda_{acc} \cdot (e_v[k] - e_{\hat{v}}[k]) \cdot \begin{bmatrix} a^n \\ a^{n-1} \\ \vdots \\ 1 \end{bmatrix} \quad (8)$$

where $\lambda_{acc}$ represents a learning rate of the accelerometer.

Figure 4B:
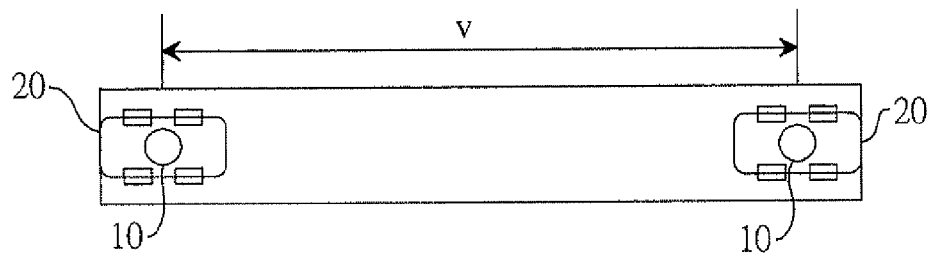
FIG. 4B is a schematic view of the inertial sensor calibration device for vehicles in FIG. 1 for fine-tuning and calibrating an accelerometer.

With reference to FIG. 4B, to increase the accuracy of the accelerometer when performing a fine-tuning and calibrating process, a vehicle 20 equipped with the observer device 11 linearly moves along a straight line having a fixed length repeatedly. Actual vehicle speeds v are measured by the observer device 11 and are compared with the predicted vehicle speeds $\hat{v}[k]$ obtained from the calibrated vehicular dynamic variation model so as to adjust the offset and scale factor of the calibrated vehicular dynamic variation model until the differences between the actual vehicle speeds v and the predicted vehicle speeds $\hat{v}[k]$ approach 0.

The present invention lets the inertial sensor learn various road conditions in advance and store the corresponding vehicular dynamic variation models so as to calculate a variation of the actual vehicle motion data according to a current road condition. Accordingly, under the premise of less than four satellites navigation system, electronic compass or pressure sensor, constant positioning and navigation with high accuracy can still be provided, and the real-time vehicle moving information can be provided to enhance the positioning continuity and reliability of the GPS.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An inertial sensor calibration method for vehicles comprising steps of:
    mounting an observer device and an inertial sensor of a vehicle carrying on an inertial move;
    acquiring actual vehicle motion data from the observer device and inertial signal data from the inertial sensor within a cycle;
    creating an original vehicular dynamic variation model to integrate the inertial signal data within the cycle to obtain predicted vehicle motion data, wherein the original vehicular dynamic variation model has multiple parameters associated with offset and scale factor;
    acquiring differences between variations of the actual vehicle motion data over the cycle and the predicted vehicle motion data;
    applying an energy optimization and a discretization to the differences so as to obtain multiple parametric error variances; and
    calibrating the original vehicular dynamic variation model according to the parametric error variances to acquire a calibrated vehicular dynamic variation model.

2. The inertial sensor calibration method for vehicles as claimed in claim 1, wherein
    the inertial sensor is a gyroscope and outputs angular speeds within the cycle used as the inertial signal data, so that the angular speeds are integrated to be rotation angles used as the predicted vehicle motion data, wherein the observer device outputs vehicle angles used as the actual vehicle motion data; and
    the parametric error variances having an offset error variance and a scale factor error variance are calculated by a second-order energy optimization and a gradient method.

3. The inertial sensor calibration method for vehicles as claimed in claim 2 further comprising a fine-tuning and calibrating step of letting the vehicle equipped with the observer device repeatedly move along a fixed turning angle to acquire the vehicle angles and comparing the vehicle angles with the rotation angles obtained from the calibrated vehicular dynamic variation model so as to adjust the parameters associated with offset and scale factor of the calibrated vehicular dynamic variation model until differences between the vehicle angles and the rotation angles corresponding to the vehicle angles approach zero.

4. The inertial sensor calibration method for vehicles as claimed in claim 1, wherein
    the inertial sensor is an accelerometer and outputs accelerations within the cycle used as the inertial signal data, so that the accelerations are integrated to be linear speeds used as the predicted vehicle motion data, wherein the observer device outputs vehicle speeds used as the actual vehicle motion data; and
    the parametric error variances having an offset error variance and a scale factor error variance are calculated by a second-order energy optimization and a gradient method.

5. The inertial sensor calibration method for vehicles as claimed in claim 4 further comprising a fine-tuning and calibrating step of letting the vehicle equipped with the observer device repeatedly move along a straight line to acquire the vehicle speeds and comparing the vehicle speeds with the linear speeds obtained from the calibrated vehicular dynamic variation model so as to adjust the parameters associated with offset and scale factor of the calibrated vehicular dynamic variation model until differences between the vehicle speeds and the linear speeds corresponding to the vehicle speeds approach zero.

6. An inertial sensor calibration device for vehicles comprising:
   an observer device sensing and outputting actual vehicle motion data of a vehicle carrying on an inertial move;
   an inertial sensor sensing inertial signal data of the vehicle and outputting the sensed inertial signal data;
   a memory unit electrically connected to the observer device and the inertial sensor to store the actual vehicle motion data, the sensed inertial signal data and a vehicular dynamic variation model having parameters associated with offset and scale factor; and
   a processor electrically connected to the memory unit and built in with a learning and calibration procedure for learning the actual vehicle motion data associated with various road conditions, calibrating the vehicular dynamic variation model and storing the calibrated vehicular dynamic variation model back to the memory unit.

7. The inertial sensor calibration device for vehicles as claimed in claim 6, wherein the learning and calibration procedure has steps of:
   acquiring actual vehicle motion data from the observer device and inertial signal data from the inertial sensor within a cycle;
   creating an original vehicular dynamic variation model to integrate the inertial signal data within the cycle to obtain predicted vehicle motion data;
   acquiring differences between variations of the actual vehicle motion data over the cycle and the predicted vehicle motion data;
   applying an energy optimization and a discretization to the differences so as to obtain multiple parametric error variances; and
   calibrating the original vehicular dynamic variation model according to parametric error variances to acquire the calibrated vehicular dynamic variation model.

8. The inertial sensor calibration device for vehicles as claimed in claim 7, wherein
   the inertial sensor is a gyroscope and outputs angular speeds within the cycle used as the inertial signal data, so that the angular speeds are integrated to be rotation angles used as the predicted vehicle motion data, wherein the observer device outputs vehicle angles used as the actual vehicle motion data; and
   the parametric error variances having an offset error variance and a scale factor error variance are calculated by a second-order energy optimization and a gradient method.

9. The inertial sensor calibration device for vehicles as claimed in claim 8, further comprising a fine-tuning and calibrating step of letting the vehicle equipped with the observer device repeatedly move along a fixed turning angle to acquire the vehicle angles and comparing the vehicle angles with the rotation angles obtained from the calibrated vehicular dynamic variation model so as to adjust the parameters associated with offset and scale factor of the calibrated vehicular dynamic variation model until differences between the vehicle angles and the rotation angles corresponding to the vehicle angles approach zero.

10. The inertial sensor calibration device for vehicles as claimed in claim 7, wherein
    the inertial sensor is an accelerometer and outputs accelerations within the cycle used as the inertial signal data, so that the accelerations are integrated to be linear speeds used as the predicted vehicle motion data, wherein the observer device outputs vehicle speeds used as the actual vehicle motion data; and
    the parametric error variances having an offset error variance and a scale factor error variance are calculated by a second-order energy optimization and a gradient method.

11. The inertial sensor calibration method for vehicles as claimed in claim 10 further comprising a fine-tuning and calibrating step of letting the vehicle equipped with the observer device repeatedly move along a straight line to acquire vehicle speeds and comparing the vehicle speeds with the linear speeds obtained from the calibrated vehicular dynamic variation model so as to adjust the parameters associated with offset and scale factor of the calibrated vehicular dynamic variation model until differences between the vehicle speeds and the linear speeds corresponding to the vehicle angles approach zero.

* * * * *